United States Patent
Dawid et al.

(10) Patent No.: US 8,340,170 B2
(45) Date of Patent: Dec. 25, 2012

(54) RECEIVER AND APPARATUS FOR RECEIVING A DATA SIGNAL

(75) Inventors: Herbert Dawid, Aachen (DE); Matthias Hillebrand, Duisburg (DE); Steffen Paul, Baierbrunn (DE); Lothar Winkler, Duesseldorf (DE); Manfred Zimmermann, Sauerlach (DE)

(73) Assignee: Intel Mobile Communications GmbH, Neubiberg (DE)

( * ) Notice: Subject to any disclaimer, the term of this patent is extended or adjusted under 35 U.S.C. 154(b) by 644 days.

(21) Appl. No.: 11/840,265

(22) Filed: Aug. 17, 2007

(65) Prior Publication Data

US 2008/0043828 A1 Feb. 21, 2008

(30) Foreign Application Priority Data

Aug. 17, 2006 (DE) .................... 10 2006 038 411

(51) Int. Cl.
*H03K 5/159* (2006.01)

(52) U.S. Cl. ........ 375/230; 375/229; 375/231; 375/232; 375/233; 375/234; 375/340; 375/342; 375/346; 375/350; 375/351

(58) Field of Classification Search .......... 375/229–234, 375/340, 342, 346, 350, 351
See application file for complete search history.

(56) References Cited

U.S. PATENT DOCUMENTS

| | | | | |
|---|---|---|---|---|
| 5,414,732 A | * | 5/1995 | Kaufmann | 375/232 |
| 5,644,597 A | * | 7/1997 | Ueda | 375/232 |
| 5,708,703 A | * | 1/1998 | Nagaraj | 379/340 |
| 5,796,820 A | | 8/1998 | Sasada | |
| 7,098,821 B2 | * | 8/2006 | Husted et al. | 341/61 |
| 7,193,983 B2 | * | 3/2007 | Liang et al. | 370/335 |
| 7,693,210 B2 | * | 4/2010 | Margetts et al. | 375/150 |
| 8,135,057 B2 | * | 3/2012 | Mondragon-Torres et al. | 375/232 |
| 2003/0236074 A1 | * | 12/2003 | Ishii et al. | 455/69 |
| 2004/0037354 A1 | * | 2/2004 | Jayaraman et al. | 375/229 |
| 2004/0127164 A1 | * | 7/2004 | Mondragon-Torres et al. | 455/67.11 |
| 2006/0109892 A1 | * | 5/2006 | Li et al. | 375/148 |

* cited by examiner

Primary Examiner — Sam K Ahn
Assistant Examiner — Sophia Vlahos
(74) Attorney, Agent, or Firm — SpryIP, LLC

(57) ABSTRACT

A receiver for receiving a data signal having a channel profile may include an equalizer, to which the data signal is feedable, the equalizer having a plurality of filters and a switching device coupled to the filters, a selection device, which is disposed such that it determines a first number and a second number in dependence on the channel profile, and the switching device is disposed such that it connects a number of linear filters corresponding to the first number to form a first overall filter and connects a number of linear filters corresponding to the second number to form a second overall filter.

12 Claims, 3 Drawing Sheets

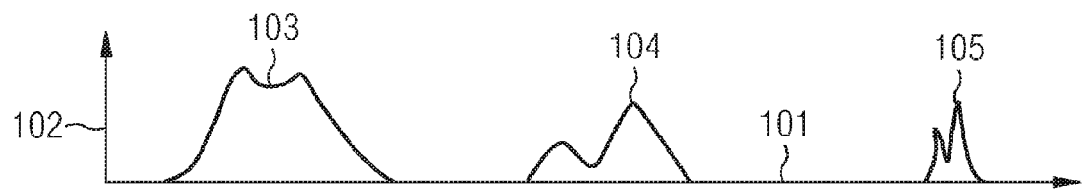
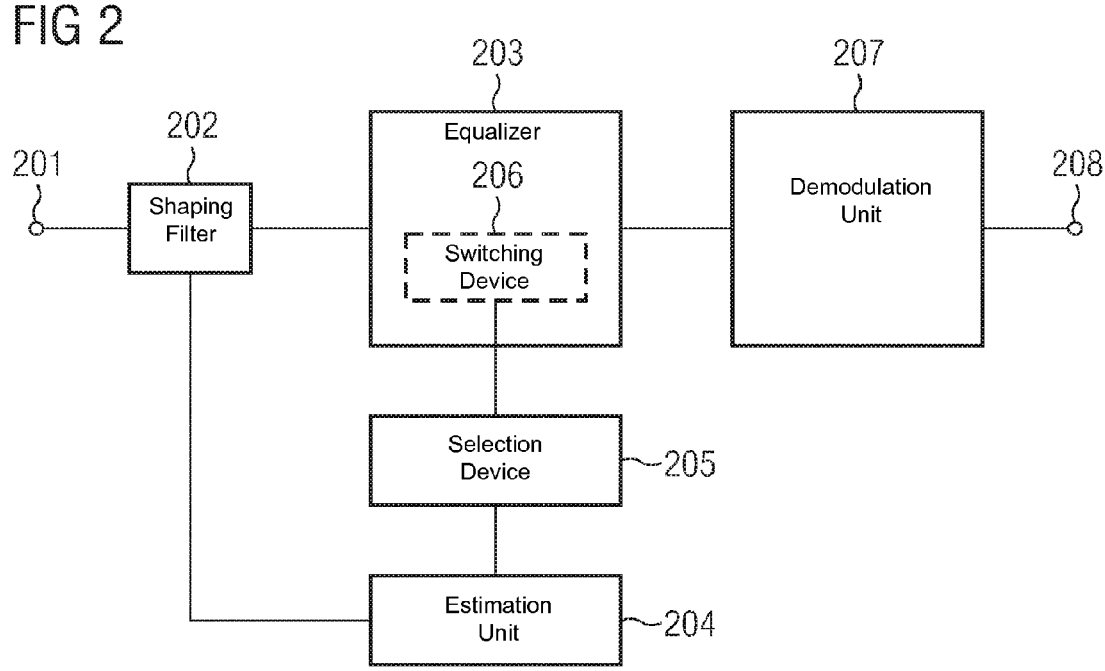

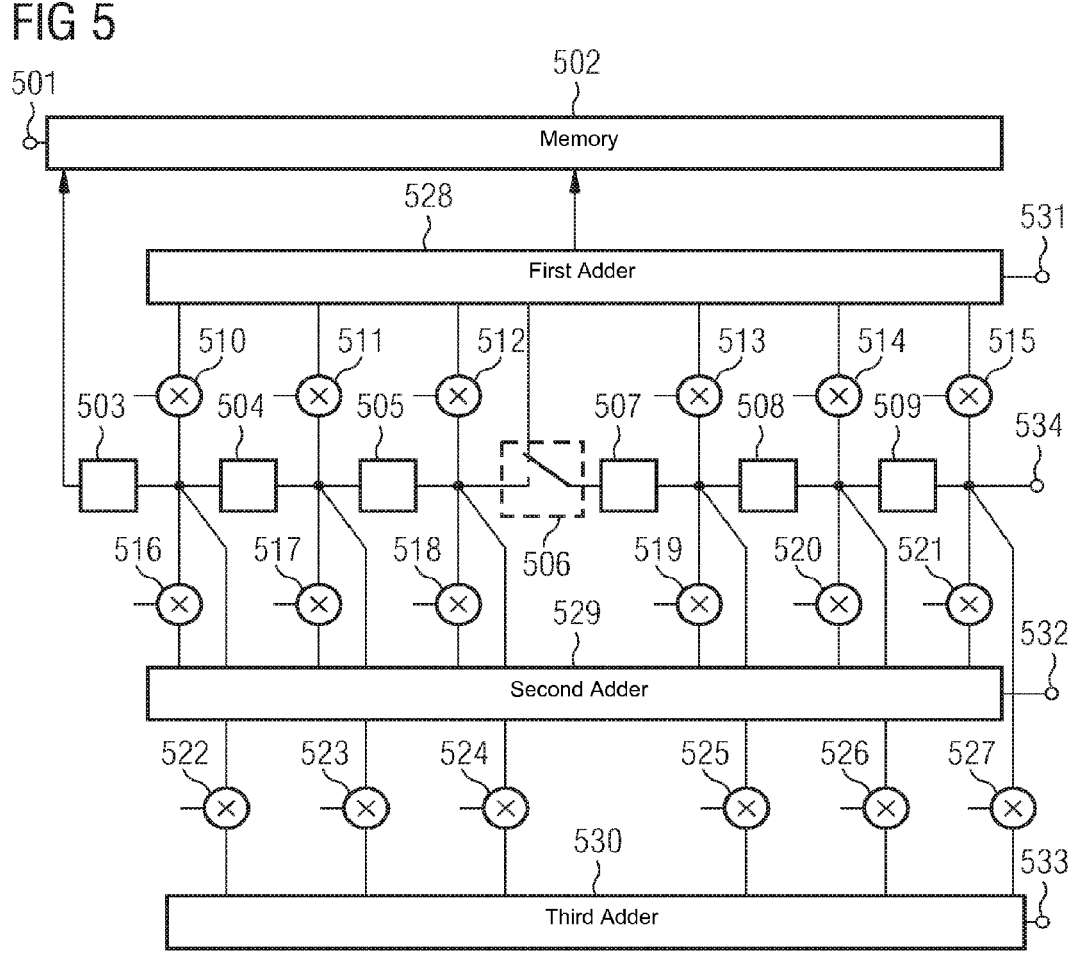

RECEIVER AND APPARATUS FOR RECEIVING A DATA SIGNAL

RELATED APPLICATION INFORMATION

This application claims priority to German Patent Application DE 10 2006 038 411.3-31 filed on Aug. 17, 2006.

FIELD OF THE INVENTION

The present invention relates to a receiver and to an apparatus for receiving a data signal, in particular for receiving a data signal having a channel profile.

BACKGROUND

In mobile radio systems, a data signal transmitted from a transmitter to a receiver is subject to distortion by the physical transmission channel. Among other effects, distortion may be caused by a so-called multipath propagation, in which a data signal is influenced for example by reflection, scattering or diffraction at various obstacles—such as at mountains or at buildings. Because of the multipath propagation, a plurality of received versions of a transmitted data signal (replicas) is received at an input of the receiver, said versions being temporally shifted with respect to one another and attenuated differently. The received and distorted replicas are superposed at the input of the receiver to form an incoming data signal. The different propagation times of multipath components thus give cause to a temporal dispersion of the received data signal. Consequently, a symbol of the received data signal may interfere with adjacent symbols or there is interference into a symbol from adjacent symbols. This effect is referred to as intersymbol interference (ISI). The transmission quality of the communication system may be considerably reduced by the ISI.

The received data signal has a channel profile in which the signal energy of a symbol peaks around different points in time to form clusters. The clusters have a width caused by adjacent multipath components. In an urban region typical multipath channel delays are 4 µs, e.g. in mountainous areas, however, multiple echoes of the transmission signal may cause delays of up to 20 µs. The diverse scenarios have to be taken into account by the receiver.

In order to raise the transmission data rate of the communication system, parallel logical channels are often used for data transmission. E.g. this is the case in a system according to the Universal Mobile Telecommunication Standard (UMTS) as defined in Release 99 or Release 4 of the same. An other example is a so-called high-speed downlink packet access (HSDPA). In both cases, the number of logical channels is obtained by a number of spreading codes used in parallel, each logical channel being assigned to a specific spreading code. The logical channels are also referred to as code channels. By construction, the spreading codes are orthogonal to one another, so that the code channels do not interfere with one another on a signal propagation path. The ISI gives rise to interference among the parallel code channels upon dispreading, such that the signal to interference ratio (SIR) decreases. The achievable data transmission rate of the communication system consequently decreases as well.

It is known to use a rake receiver architecture in order to increase the transmission quality. The functioning of a rake receiver consists in separately evaluating high-energy received versions of the received data signal in so called rake fingers, i.e. in individual correlation receivers, and in reconstructing the data signal in respect of amplitude and phase so to maximize the received signal energy.

The functioning of the rake receiver is advantageous if there is sufficient timely separation between different signal paths of the data signal, i.e. between different signal energy clusters. This may be true if the spreading factors are chosen to be high, i.e. a high number of chips is chosen for the spreading of an individual data symbol. A rake receiver can be used for a communication system with low spreading factors only if the number of parallel logical channels remains low. E.g. in HDSPA the number of parallel logical channels is not greater than five.

SUMMARY

In a receiver embodiment, the receiver for receiving a data signal having a channel profile comprises an equalizer, to which the data signal is feedable. The equalizer comprises a plurality of filters and a switching device coupled to the filters. The receiver further comprises a selection device, which is disposed such that it determines a first number and a second number in dependence on the channel profile. The switching device is disposed such that it connects a number of linear filters corresponding to the first number to form a first overall filter and connects a number of linear filters corresponding to the second number to form a second overall filter.

One apparatus embodiment of the invention comprises:
 a circuitry for determining a channel profile on the basis of the data signal received,
 a circuitry for determining a first number and of a second number in dependence on properties of the channel profile,
 a circuitry for connecting a first number of filters in an equalizer to form a first overall filter, and
 a circuitry for connecting a second number of filters to form a second overall filter.

BRIEF DESCRIPTION OF THE DRAWINGS

The accompanying drawings are included to provide a further understanding of the invention, are incorporated in, and constitute a part of this specification. The drawings illustrate the embodiments of the invention and together with the description serve to explain the principles of the invention. Other embodiments of the invention and many of the intended advantages of the invention will be readily appreciated, as they become better understood by reference to the following description. Like reference numerals designate corresponding similar parts.

FIG. 1 illustrates a channel profile with delayed signal energy clusters,

FIG. 2 illustrates a receiver embodiment for receiving a data signal having a channel profile, FIG. 5 illustrates an equalizer having filter elements for two diversity modes.

DETAILED DESCRIPTION

Figure 3:
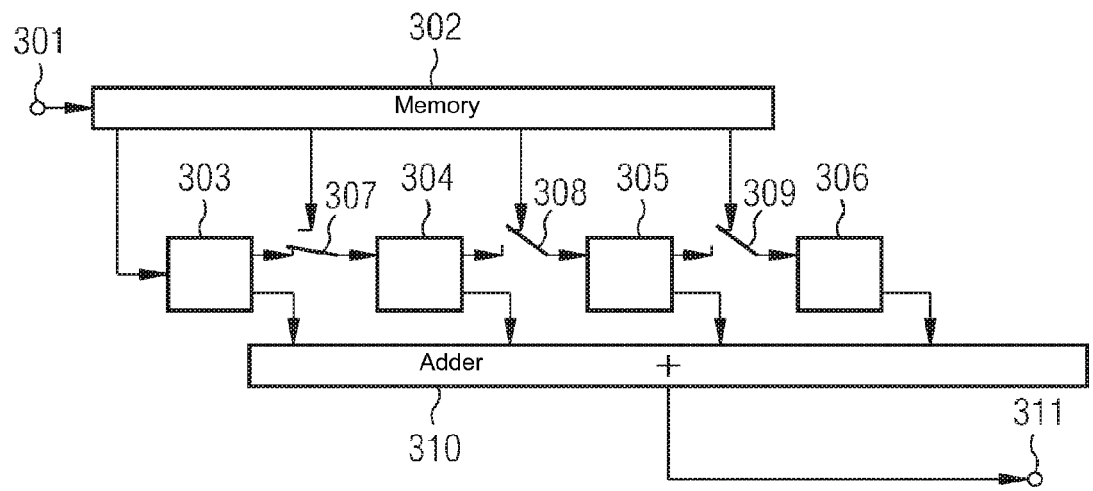
FIG. 3 illustrates an equalizer in a receiver for receiving a data signal having a channel profile.

FIG. 1 illustrates a channel profile with delayed signal energy clusters. In the diagram, time is indicated on an abscissa 101, against which signal energy of a symbol is plotted on an ordinate 102. The signal energy shows a first cluster 103 at a first point in time, a second cluster 104 at a later point in time, and a third signal energy cluster 105 at an even later point in time. The first cluster 103, the second cluster 104 and the third cluster 105 of the signal energy correspond to a respective propagation path of a physical transmission channel. The three clusters are distinct from one another. Energy transmitted with each cluster equivalents to the area enclosed by the respective cluster. In the example shown, the first cluster 103 embraces the largest signal level. The first cluster 103 corresponds to a propagation path having a high dispersion, so that the first cluster 103 is relatively wide. The second cluster 104 exhibits a lower signal level as compared to the first cluster 103. It corresponds to a propagation path causing a higher attenuation than the propagation path of the first cluster 103. The dispersion associated with the propagation path of the second cluster 104 likewise leads to a widening of the symbol. Moreover, the second cluster 104 exhibits two maxima lying very close together. This represents two propagation paths that lead to an almost contemporaneous delay. The received replicas corresponding to the two propagation paths are smeared to form the second cluster 104. The third cluster 105 exhibits a signal level that is lower than the signal level of the two preceding clusters 103 and 104. The respective replica may be transmitted via a propagation path having a high degree of attenuation.

FIG. 2 illustrates a receiver embodiment for receiving a data signal having a channel profile. The receiver has an input 201. A sampled and digitized received data signal may be fed to said input 201. The input 201 connects to a pulse shaping filter 202. The pulse shaping filter 202 may be implemented as a root-cosine-filter. It connects to an equalizer 203 and to an estimation unit 204. In the estimation unit 204, a channel profile and/or a delay profile of the transmission channel is determined by a correlation procedure. If appropriate, further averaging methods may be applied during signal processing. The estimation unit 204 connects to a selection device 205, which connects to a switching device 206 (illustrated by dashed lines) arranged in the equalizer 203. Filters, which may be provided in the equalizer 203, are not illustrated. The equalizer 203 connects to a demodulation unit 207, to which an equalized data signal is fed by the equalizer 203. In the demodulation unit 207, the equalized data signal is further processed and provided at an output 208.

In one embodiment, the equalizer is disposed such that the data signal is feedable to the first overall filter and to the second overall filter.

This embodiment advantageously permits a parallel construction of the equalizer. The equalizer then has a first overall filter and a second overall filter to which a received data signal is feedable in each case.

In one embodiment, the equalizer is disposed such that the data signal is feedable to the second overall filter via a delay element.

The equalizer can therefore assume the structure of a rake receiver. This is the case, for example, when the received data signal is fed to the second overall filter at a different point in time than to the first overall filter. Through a suitable choice of the delay, in the case of a channel profile having a plurality of temporally separate received versions or signal energy clusters, it is possible to use each overall filter for equalizing one of the received versions or clusters. The signal can subsequently be reconstructed to form a data signal, the received signal energy being maximized.

In one embodiment, the receiver has a memory element which couples to the equalizer, wherein the data signal can be stored in sections in the memory element.

This means that the data signal received can be stored in sections and subsequently be fed to the first overall filter and/or to the second overall filter.

In one embodiment, the memory element is disposed such that the stored data can be read out as desired.

As a result, the data is feedable to the first overall filter and/or to the second overall filter at any desired points in time. In this case, it is particularly advantageous that the points in time can be chosen freely, such that the equalizer can be adapted dynamically to different channel profiles. This means that it is possible to adapt or increase the data transmission quality even during the operation of the receiver.

In one embodiment, the equalizer has at least three filters.

Since the filter length of the first overall filter and that of the second overall filter can be set through the choice of the respective number of connected filters, a dispersion corresponding to a propagation path in the transmission channel can therefore advantageously be taken into account with the setting of the filter length. In this case, it is possible to take account of the fact that different clusters, i.e. Received versions, are transmitted via different propagation paths, in which case dispersion properties may be present differently for different propagation paths.

By way of example, in a simple case in which the dispersion for two propagation paths is identical or similar, a filter is in each case assigned to the first overall filter and to the second overall filter. In a further example, in which the dispersion is different, the first overall filter is assigned one filter and the second overall filter arises through a connection of two filters. The case where an individual, very wide cluster characterizes the channel profile is likewise conceivable, such that the first overall filter has the three filters connected to one another, while the second overall filter has no filter.

In one embodiment, the receiver has an estimation unit for determining the channel profile.

In one embodiment, the estimation unit is disposed such that the channel profile can be determined on the basis of pilot signals that are different from the data signals.

In one embodiment, the equalizer has in each case an equalizer path for a diversity mode.

FIG. 3 illustrates an equalizer for use in a receiver for receiving a data signal having a channel profile. The equalizer has an equalizer input 301 that connects to a data memory 302. The data memory 302 serves for compensating for the temporal delay between the cluster and the channel profile. For this purpose, the data memory 302 may be realized as a ring memory, for example. The data memory 302 connects to a first filter 303. The data memory 302 further connects to a first switching element 307, a second switching element 308, and a third switching element 309. The first switching element 307 connects to the first filter 303 and to a second filter 304. Depending on a chosen state of the first switching element 307, the second filter 304 connects, on the input side, either to the data memory 302 or to the first filter 303.

The second switching element 308 connects to a third filter 305 and to the second filter 304. Depending on a switching state of the second switching element 308, the third filter connects, on the input side, to the data memory 302 or the second filter 304. The third switching element 309 connects to a fourth filter 306 and the third filter 304. Depending on a switching state of the third switching element 309, the fourth filter 306 connects either to the data memory 302 or to the third filter 305. The first filter 303, the second filter 304, the third filter 305 and the fourth filter 306 are connected on the output side to an adder 310. The adder 310 adds the output signals of the first filter 303, the second filter 304, the third filter 305 and the fourth filter 306. The added signal is provided at an equalizer output 311.

The equalizer shown in FIG. 3 may be arranged for example in the receiver shown in FIG. 2. The exemplary embodiment shown has four filters. The filters are for example linear filters with four taps for application of filter coefficients. In one embodiment, approximately ten linear filters are provided. However, it is also readily possible to provide a larger or smaller number of filters in the equalizer. The number of switching elements is chosen correspondingly.

The first switching element 307, the second switching element 308 and the third switching element 309 are parts of the switching device for changing the equalizer properties. FIG. 3 shows a state of the switching device in which the first switching element 307 connects the second filter 304 and the first filter 303 to form a first overall filter. The second switching element connects the third filter 305 to the data memory 302 on the input side. The third switching element 309 connects the fourth filter 306 likewise to the data memory 302. The states of the switching elements are chosen by way of example for a channel profile shown in FIG. 1. The first filter 303 and the second filter 304 serve as overall filter for equalizing the received version transmitted in the first cluster 103. This received version is particularly wide, such that an overall filter having the largest possible filter length is provided, while the received version of the second cluster 104 and of the third cluster 105 have a width such that they can be equalized by means of a linear filter having a small filter length. The first cluster 103, the second cluster 104, and the third cluster 105 are delayed from one another so that the signal energy can in each case be taken into account independently of one another in the equalization.

The equalizer thus realizes the aspect that it may split up into individual overall filters that are fed from a single data source or the data memory 302, data streams fed to the individual overall filters being temporally offset. The allocation of individual or a plurality of linear filters to exerts of the channel profile can be changed flexibly through the choice of the states of the switching elements. In this case, the equalizer uses both the principle of the linear filter and the principle of a rake receiver in which individual filters are assigned to individual propagation paths. The number of channel coefficients which have to be determined for the individual filters or the overall filters can then be concomitantly reduced to a low-dimension matrix, such that the algorithms for determining the channel filters can be carried out rapidly. Other channel profiles are reflected by an according choice of the states of the switching elements in the equalization.

The first filter 303, the second filter 304, the third filter 305 and the fourth filter 306 can be embodied as a linear filter or as so-called Finite Impulse Response filters (FIR filter).

One aspect of the embodiment is that the equalizer provided in the receiver can be separated at least into the first overall filter and a second overall filter. The first overall filter is composed of a number of filters corresponding to the first number. The filter length of the first overall filter is thus determined by the first number. The second overall filter is composed of a number of filters corresponding to the second number. The filter length of the second overall filter is thus determined by the second number.

To put it in other words, a first filter length of the first overall filter and a second filter length of the second overall filter can be set by means of the switching device. The selection of the first filter length is effected on the basis of the first number and the selection of the second filter length is effected on the basis of the second number.

The first number and the second number are determined in dependence on the channel profile. The first filter length and the second filter length can therefore be adapted advantageously to the conditions of the transmission channel. The receiver is therefore suitable for equalizing the data signal for different channel profiles. The number of computational operations when determining the filter coefficients is reduced as a result of the adaptation of the filter length to the conditions. The allocation of individual or a plurality of filters for the composition of the individual overall filters can be changed in a flexible manner.

If, by way of example, the channel profile has a first cluster and a second cluster, the first cluster exhibiting a greater width than the second cluster, then a first number is determined by means of the selection device, said first number being greater than the second number. Correspondingly, the number of filters connected to form the first overall filter is more than the number of filters connected to form the second overall filter. In this example, the first overall filter has a greater filter length than the second overall filter. The first overall filter and the second overall filter can be used as individual equalizers. The output signals of the overall filters can be combined later in order to obtain an equalized overall signal. This means that the first overall filter is suitable for being used for equalizing the first cluster in the channel profile, while the second overall filter can be used for equalizing the second cluster.

In this case, the division is not just restricted to two overall filters. If there are a larger number of clusters, it is also possible to form three or more overall filters, whereby a correspondingly determined third number or further, respectively determined numbers define the filter length thereof.

Figure 4:
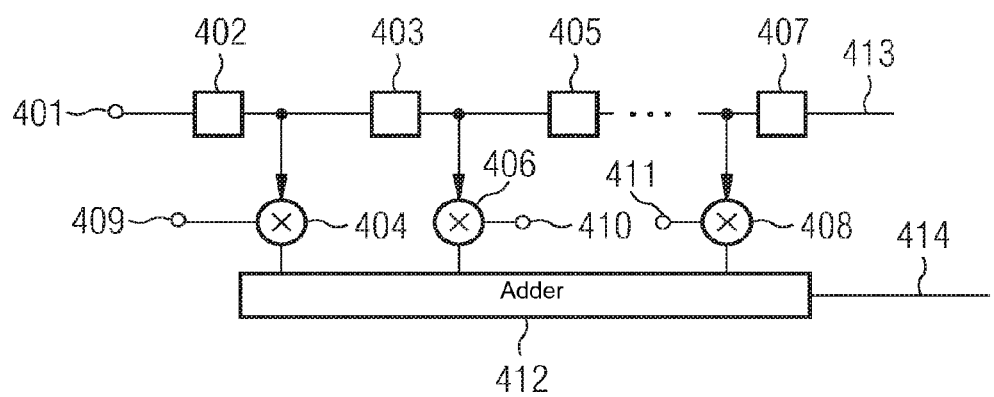
FIG. 4 illustrates an FIR filter.

FIG. 4 illustrates an FIR filter for use in an equalizer. The FIR filter has an input 401 connected to first delay element 402. On the output side, the first delay element 402 connects to a second delay element 403 and a first multiplier 404. On the output side, the second delay element 403 connects to a third delay element 405 and a second multiplier 406. The third delay element 405 couples to the input of a fourth delay element 407 and to a third multiplier 408. The first multiplier 404 multiplies an output signal of the first delay element 402 by a first filter coefficient, which is fed in at a first tapping point 409. The second multiplier 406 multiplies an output signal of the second delay element 403 by a second filter coefficient, which is fed in at a second tapping point 410. The third multiplier multiplies an input signal of the fourth delay element by a third filter coefficient, which is fed in at a third tapping point 411. The output signals of the first multiplier 404, of the second multiplier 406, and of the third multiplier 408 are summed in an adder 412. The third delay element 407 couples to a first output 413 on the output side, and the adder 412 couples to a second output 414 on the output side. The summed signal of the components obtained from the various multipliers is provided at the second output 414; this output signal is the filtered signal of the data signal fed in at the input. The first output 413 is suitable for being coupled to one of the switching elements in an equalizer in accordance with the embodiment according to FIG. 3. The overall filter, a filter having a relatively large filter length can be produced by interconnecting an input of a downstream filter to the first output 413.

FIG. 4 illustrates by way of example three multipliers and three tapping points for feeding filter coefficients to the FIR filter. It is possible to provide a plurality of these tapping points and multipliers, further delay elements and multipliers correspondingly being provided between the third delay element 405 and the fourth delay element 407, and the multipliers being coupled to the adder 412 on the output side. A filter having a higher filter length is configured in this way.

FIG. 5 shows a detailed configuration of an equalizer having filter elements for diversity modes. The equalizer has an input 501 coupled to a data memory 502. The data memory is designed for example as a ring memory, or else as a dynamic access memory, in which the incoming data signal is stored in sections.

The equalizer furthermore has a chain of delay elements. A first delay element 503 couples to the data memory 502 on the input side. This can be done for example by means of a read pointer that accesses an address of the data memory. On the output side, the first delay element 503 couples to the input of a second delay element 504. On the output side, the second delay element 504 connects to the input of a third delay element 505. On the output side, the third delay element 505 couples to a switching element 506 (illustrated by dashed lines). The switching element 506 couples to the data memory 502 by means of a read pointer, such that it can read out an address from the data memory 502. The switching element 506 additionally couples to a fourth delay element 507. Depending on a switching state of the switching element 506, the input of the fourth delay element 507 either couples via the read pointer to the data memory 502, or couples to the output of the third delay element 505. On the output side, the fourth delay element 507 couples to a fifth delay element 508. On the output side, the fifth delay element 508 couples to a sixth delay element 509. The delay element 509 couples to a fourth output 534 of the equalizer, to which for example a second switching element couples in order to couple a continuation of the filter structure, as is also illustrated in FIG. 3.

The output of the first delay element 503 couples to a first multiplier 510, to a seventh multiplier 516 and to a thirteenth multiplier 522. The output of the second delay element 504 couples to a second multiplier 511, to an eighth multiplier 517 and to a fourteenth multiplier 523. The output of the third delay element 505 couples to a third multiplier 512, to a ninth multiplier 518 and to a fifteenth multiplier 524. The output of the fourth delay element couples to a fourth multiplier 513, to a tenth multiplier 519, and to a sixteenth multiplier 525. The output of the fifth delay element 508 couples to a fifth multiplier 514, an eleventh multiplier 520, and to a seventeenth multiplier 526. The output of the sixth delay element 509 couples to a sixth multiplier 515, a twelfth multiplier 521, and an eighteenth multiplier 527. Each multiplier has a tap via which a respective filter coefficient is fed. The outputs of the first multiplier 510, the second multiplier 511, the third multiplier 512, the fourth multiplier 513, the fifth multiplier 514, of the sixth multiplier 515, couple to a first adder 528, in which the respective output signals are summed in order to be provided to a first output of the equalizer 531.

The outputs of the seventh multiplier 516, of the eighth multiplier 517, of the ninth multiplier 518, of the tenth multiplier 519, of the eleventh multiplier 520, and of the twelfth multiplier 521 are coupled to a second adder 529, with the result that the output signals of the abovementioned multipliers are summed to form an output signal that is provided to a second output of the equalizer 532. The outputs of the thirteenth multiplier 522, of the fourteenth multiplier 523, of the fifteenth multiplier 524, of the sixteenth multiplier 525, of the seventeenth multiplier 526, and of the eighteenth multiplier 527 are coupled to a third adder 530, with the result that the output signals of said multipliers are summed to form an output signal that is provided to a third output of the equalizer 533.

The equalizer structure shown has essentially three FIR filters, which advantageously jointly utilize the chain of the delay elements. In one switching state of the switching element 506, a common overall filter arises if the fourth delay element 507 is coupled, on the input side, to the output of the third delay element 505. In the other case, the fourth delay element 507 is coupled, on the output side, to an address of the data memory 502. Two equalizers operating in parallel are provided in this way. The equalizers can filter out different data signals through a suitable choice of the filter coefficients. This is possible for example for diversity modes.

Third generation mobile radio systems, such as UMTS according to 3GPP (3rd Generation Partnership Project), provide the use of transmission antenna diversity (so-called TX antenna diversity). Transmission antenna diversity means that at least two different antennas emit the transmitted signal. If two transmission antennas are used, as is the case for example for the UMTS standard (Universal Mobile Telecommunications System), it is possible to code the emitted signal on one or both transmission antennas (usually on the connected second antenna) according to a specific specification, such that both transmitted signal streams are transmitted at the same time orthogonally with respect to one another. Through suitable decoding of the received signal resulting from a superposition of the antenna signals emitted by the two transmission antennas, the performance of the data transmission system can be significantly improved by TX antenna diversity.

Four TX antenna diversity modes are provided in the UMTS standard: in the normal mode, no TX antenna diversity is used, that is to say that the signal emission is effected via a single antenna. In the STTD mode (Space Time Transmit Diversity), the unchanged transmission data stream is emitted via the first antenna and the STTD-coded data stream is emitted via the second antenna. The STTD coding has the effect that in each case two successive received symbols are required in order to determine two symbols on which the STTD coding is based in the receiver. The STTD coding—carried out in the STTD mode—of the data stream emitted via the second antenna can be gathered from the UMTS standard 3GPP TS 25.211 V4.6.0 (2002-09) in section 5.3.1.1. Two transmission antennas are likewise used in CLTD (Closed-Loop Transmit Diversity). The transmission antenna powers are controlled in an antenna-specific manner by feedback information fed back from the receiver to the transmitter (base station). The so-called CLTD1 mode is specified in the UMTS standard. Further details can be gathered from the UMTS standard 3GPP TS 25.214 V6.8.0 (2006-03) in section 7.2. (CLTD1 mode).

A particular case occurs, if two data channels are emitted with different TX antenna diversity modes, as can occur in the CLTD mode. In this case, a control channel is present in an STTD mode and the data channel is present in a CLTD mode. The different modes require different coefficients for the equalizer filter, with the result that two parallel filter structures are necessary for simultaneous perception.

Through a suitable choice of the filter coefficients provided at the multipliers, a signal assigned to a first transmission antenna of an STTD coding can thus be provided at the first output 531. A signal assigned to a second transmission antenna of an STTD coding can be provided at the second output 532. The data signal transmitted in the STTD coding can be reconstructed from both signals.

Likewise, another data channel of a CLTD coding can be provided parallel at the third output 533 of the equalizer.

An extremely flexible equalizer thus results overall. This has been illustrated by way of example. In particular the number of filters, the length of the filters and the number of parallel equalizer structures having recourse to a common chain of delay elements can be adapted according to the respective circumstances. It is likewise possible to construct a plurality of parallel equalizer structures having recourse to a plurality of parallel chains of delay elements.

Although the invention has been shown and described with respect to a certain embodiments, equivalent alterations and modifications will occur to others skilled in the art upon the reading and understanding of this specification and the annexed drawings. For example, although bipolar or CMOS technologies are used in various embodiments of the invention, in other embodiments, other suitable technologies can be used. In regard to the various functions performed by the above described components or circuits, terms used to describe such components are intended to correspond, unless otherwise indicated, to any component which performs the specified function of the described component (i.e., that is functionally equivalent), even though not structurally equivalent to the disclosed structure which performs the function in the exemplary embodiments of the invention. Terms such as "coupled" should be interpreted to mean either directly coupled or indirectly coupled. Terms such as "connected" should be interpreted to mean either directly connected or indirectly connected. Furthermore, to the extent that the term "includes" is used in either the detailed description or the claims, such term is intended to be inclusive in a manner similar to the term "comprising." While a particular feature of the invention may have been disclosed with respect to only one of several embodiments of the invention, such a feature may be combined with one or more other features of the other embodiments as may be desired and advantageous for any given or particular application.

What is claimed is:

1. A receiver for receiving a data signal having a channel profile, comprising
    an equalizer, to which the data signal is feedable, the equalizer having a plurality of filters and a switching device coupled to at least a plurality of the plurality of filters,
    a selection device, which is disposed such that it determines a first number and a second number in dependence on the channel profile, the channel profile including at least two signal energy clusters, a first of the clusters having a signal energy peak offset in time from a signal energy peak of a second of the clusters, and each of the at least two signal energy clusters having a width defined at least by multipath components, and
    a memory coupled to the equalizer, the memory to store the first of the clusters in a first memory section and the second of the clusters in a second memory section,
    wherein the switching device is disposed such that it connects a number of the plurality of filters corresponding to the first number to form a first overall filter and connects a number of the plurality of filters corresponding to the second number to form a second overall filter, and the switching device enables the first overall filter to receive the first of the clusters stored in the first memory section and enables the second overall filter to receive the second of the clusters stored in the second memory section.

2. A receiver according to claim 1, wherein the equalizer is disposed such that the data signal is feedable to the first overall filter and to the second overall filter.

3. A receiver according to claim 2, wherein the equalizer is disposed such that the data signal is feedable to the second overall filter via a delay element.

4. A receiver according to claim 1, wherein the memory element is disposed such that the stored data is retrieved as desired.

5. A receiver according to claim 1, wherein the equalizer has at least three filters.

6. A receiver according to claim 1, comprising: an estimation unit for determining the channel profile.

7. A receiver according to claim 6, wherein the estimation unit is disposed such that the channel profile is determined based on a pilot signal that differs from the data signal.

8. A receiver according to claim 1, wherein the equalizer is switchable to function in a diversity mode.

9. A receiver according to claim 1, wherein the selection device determines a third number and the switching device is disposed such that it connects a number of filters corresponding to the third number to form a third overall filter.

10. A receiver according to claim 1, wherein the first signal energy cluster has a width greater than a width of the second signal energy cluster, the first number being associated with the first signal energy cluster and having a value greater than a value of the second number.

11. A receiver according to claim 1, wherein the number of the plurality of filters corresponding to the first number is greater than the number of the plurality of filters corresponding the second number.

12. A receiver according to claim 1, wherein each of the first and second overall filters comprises a plurality of delay elements each individually coupled to the memory via a multiplier that is to receive a filter coefficient.

* * * * *